(12) United States Patent
Antonopoulos et al.

(10) Patent No.: US 10,769,134 B2
(45) Date of Patent: Sep. 8, 2020

(54) RESUMABLE AND ONLINE SCHEMA TRANSFORMATIONS

(71) Applicant: Microsoft Technology Licensing, LLC, Redmond, WA (US)

(72) Inventors: Panagiotis Antonopoulos, Redmond, WA (US); Alexander Thien Tran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 618 days.

(21) Appl. No.: 15/588,323

(22) Filed: May 5, 2017

(65) Prior Publication Data

US 2018/0121494 A1  May 3, 2018

Related U.S. Application Data

(60) Provisional application No. 62/414,346, filed on Oct. 28, 2016.

(51) Int. Cl.
  *G06F 16/00* (2019.01)
  *G06F 16/23* (2019.01)
  (Continued)

(52) U.S. Cl.
  CPC ........ *G06F 16/2379* (2019.01); *G06F 16/211* (2019.01); *G06F 16/22* (2019.01); *G06F 16/2365* (2019.01); *G06F 16/24542* (2019.01)

(58) Field of Classification Search
  CPC .................. G06F 16/2379; G06F 16/22; G06F 16/24542; G06F 16/2365; G06F 16/211
  (Continued)

(56) References Cited

U.S. PATENT DOCUMENTS 6,192,376 B1  2/2001  Kincaid et al.
6,615,223 B1  9/2003  Shih
(Continued)

FOREIGN PATENT DOCUMENTS

WO  2006059250 A2  6/2006
WO  2016157191 A1  10/2016

OTHER PUBLICATIONS

Badrish Chandramouli, Christopher Bond, Shivnath Babu, Jun Yang, Query Suspend and Resume, SIGMOD'07, Jun. 12-14, 2007, Beijing, China. Copyright 2007 ACM 978-1-59593-686-8/07/0006 (Year: 2007).*

(Continued)

*Primary Examiner* — Thanh-Ha Dang

(57) ABSTRACT

A database command is received from a user for modifying an existing data structure or creating a new data structure. The database command is used to construct a query that is provided to a query optimizer component where the query is transformed into a first query execution plan including operations that persist operation state. Some data specified in the query is received, and some of the new data structure is constructed by executing some of the first query plan. While receiving some of data specified in the query and constructing some of the new data structure, operation state of execution is persisted. When an interruption of execution of the first query plan occurs, an updated query plan is generated using persisted operation state. External updates occur, before or after the interruption, but before executing the updated query plan. The external updates are transactionally validated.

20 Claims, 8 Drawing Sheets

(51) Int. Cl.
*G06F 16/21* (2019.01)
*G06F 16/2453* (2019.01)
*G06F 16/22* (2019.01)

(58) Field of Classification Search
USPC .......................................................... 707/703
See application file for complete search history.

(56) References Cited

U.S. PATENT DOCUMENTS

| | | | |
|---|---|---|---|
| 6,721,765 | B2 | 4/2004 | Ghosh |
| 6,961,729 | B1 | 11/2005 | Toohey et al. |
| 7,246,108 | B2 | 7/2007 | Ahmed |
| 7,266,656 | B2 | 9/2007 | Chen |
| 7,359,927 | B1 | 4/2008 | Cardente |
| 7,574,424 | B2 | 8/2009 | Chowdhuri |
| 8,001,078 | B2 | 8/2011 | Banks |
| 8,200,634 | B2 | 6/2012 | Driesen |
| 8,306,947 | B2 | 11/2012 | Broeder |
| 8,364,634 | B2 | 1/2013 | Horii |
| 8,417,737 | B2 | 4/2013 | Hopmann et al. |
| 8,775,477 | B2 | 7/2014 | Coverston et al. |
| 8,930,347 | B2 | 1/2015 | Broll |
| 8,938,644 | B2 | 1/2015 | Clark et al. |
| 9,053,024 | B2 | 6/2015 | Graefe |
| 9,069,805 | B2 | 6/2015 | Ritter |
| 9,116,842 | B2 | 8/2015 | Kota et al. |
| 9,135,351 | B2 | 9/2015 | Mizobuchi |
| 9,213,740 | B2 | 12/2015 | Andrei |
| 9,384,255 | B2 | 7/2016 | Wilkinson |
| 2003/0032425 | A1 | 2/2003 | Kim et al. |
| 2003/0208511 | A1 | 11/2003 | Earl |
| 2005/0240570 | A1 | 10/2005 | Ozbutun |
| 2006/0080285 | A1* | 4/2006 | Chowdhuri ......... G06F 16/24532 |
| 2008/0172356 | A1 | 7/2008 | Bruno |
| 2009/0037366 | A1 | 2/2009 | Shankar et al. |
| 2009/0083238 | A1* | 3/2009 | Chaudhuri ......... G06F 16/24561 |
| 2009/0150396 | A1* | 6/2009 | Elisha ............... G06F 16/24565 |
| 2010/0281013 | A1 | 11/2010 | Graefe |
| 2010/0306188 | A1 | 12/2010 | Cunningham |
| 2011/0228668 | A1 | 9/2011 | Pillai |
| 2012/0136868 | A1* | 5/2012 | Hammerschmidt .... G06F 16/22 707/741 |
| 2012/0166417 | A1 | 6/2012 | Chandramouli |
| 2012/0173823 | A1 | 7/2012 | Nelke |
| 2013/0103670 | A1 | 4/2013 | Kashyap |
| 2014/0236921 | A1* | 8/2014 | Belknap ............ G06F 16/24545 707/718 |
| 2014/0258628 | A1 | 9/2014 | Shivashankaraiah |
| 2014/0310258 | A1 | 10/2014 | Tian |
| 2015/0066858 | A1 | 3/2015 | Sabdar |
| 2015/0220327 | A1 | 8/2015 | Poon et al. |
| 2015/0220583 | A1 | 8/2015 | Teletia et al. |
| 2016/0117375 | A1* | 4/2016 | Antonopoulos ........ G06F 16/27 707/638 |
| 2016/0344810 | A1 | 11/2016 | Abhik |

OTHER PUBLICATIONS

Goetz Graefe, Wey Guy, Harumi Kuno, 'Pause and resume' functionality for index operations, ICDE Workshops 2011 (Year: 2011).*
"Using Parallel Execution", http://web.archive.org/web/20111124230818/http:/docs.oracle.com/cd/B28359_01/server.111/b28313/usingpe.htm, Published on: Nov. 24, 2011, 68 pages.
Mohan, et al., "Algorithms for Creating Indexes for Very Large Tables without Quiescing Updates", In Proceedings of the ACM SIGMOD international conference on Management of data, Jun. 2, 1992, pp. 361-370.
Graefe, et al., "'Pause and resume' functionality for index operations", In Proceedings of the IEEE 27th International Conference on Data Engineering Workshops, Apr. 11, 2011, pp. 28-33.
Graefe, Goetz, "Sorting and Indexing with Partitioned B-Trees", In Proceedings of First Biennial Conference on Innovative Data Systems Research, Jan. 5, 2003, 13 pages.
Graefe, Goetz, "Implementing Sorting in Database Systems", In Journal of ACM Computing Surveys, vol. 38, Issue 3, Sep. 2006, pp. 1-37.
Ponnekanti, et al., "Online Index Rebuild", In Proceedings of the ACM SIGMOD international conference on Management of data, May 16, 2000, pp. 529-538.
Chandramouli, et al., "Query Suspend and Resume", In Proceedings of the ACM SIGMOD international conference on Management of data, Jun. 12, 2007, pp. 557-568.
Li, et al., "A Practical External Sort for Shared Disk MPPs", In Proceedings of Supercomputing, Nov. 19, 1993, pp. 666-675.
Barga, et al., "Measuring and Optimizing a System for Persistent Database Sessions" in Proceedings of the 17th International Conference on Data Engineering, Apr. 2, 2001, 10 pages.
Safaeei, et al., "Caching Intermediate Results for Multiple-Query Optimization" In Proceedings of IEEE/ACS International Conference on Computer Systems and Appliations, May 13, 2007, pp. 412-415.
"Monitoring Performance By Using the Query Store" Nov. 28, 2016, 12 pages.
"Monitoring Data Replication-Overview" Oct. 11, 2015, 10 pages.
Murray, et al., "AWS Database Migration Service—Best Practices" Aug. 2016, 17 pages.
"Salesforce1: Create and Edit Records While Offline Using the Salesforce1 Downloadable Apps (Beta)" Retreived Feb. 6, 2017, 2 pages.
"Zero Downtime Database Upgrade Using Oracle GoldenGate" in Oracle White Paper, Aug. 2015, 19 pages.
"International Search Report and Written Opinion Issued in PCT Application No. PCT/US2017/057780", dated Feb. 1, 2018, 13 Pages.

* cited by examiner

RESUMABLE AND ONLINE SCHEMA TRANSFORMATIONS

CROSS-REFERENCE TO RELATED APPLICATIONS

This application claims the benefit of and priority to U.S. Provisional Patent Application Ser. No. 62/414,346 filed on Oct. 28, 2016 and entitled "Resumable and Online Schema Transformations," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Computing systems can be used to implement database systems which can be queried and have results retrieved. If query and retrieval operations have any sort of failure, all of the work performed for the query and retrieval operations is discarded. Similarly, index build operations for databases can take many hours to complete for large tables and consume a great amount of resources. Currently, their duration depends on many parameters and any failure (failover, crash, etc.) will cause the whole operation to be abandoned and to be restarted from scratch. Additionally, index build is often executed in a single transaction, generating massive amounts of log that certain architectures may not be able to handle.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method which may be practiced in a database computing environment. The method includes acts for generating a new data structure. The method includes receiving a database command from a user for modifying an existing data structure or creating a new data structure. The query is provided to a query optimizer component. At the query optimizer component, the query is transformed into a first query execution plan. The first query execution plan includes one or more operations that persist operation state of execution of the first query plan. At least a portion of data specified in the query is received, and at least a portion of the new data structure is constructed by executing at least a portion of the first query plan. While receiving the at least a portion of data specified in the query and constructing a least a portion of the new data structure, operation state of execution of the first query plan is persisted. The method includes determining that an interruption of execution of the first query plan has occurred. As a result of determining that an interruption of execution of the first query plan has occurred, an updated query plan is generated using the persisted operation state of execution of the first query plan, such that the new query plan can be executed without needing to completely restart receiving data and constructing the new data structure. The method further includes resuming receiving data and constructing the new data structure by executing the updated query plan. External updates to the new data structure are received either while data is being received as a result of execution of the first query plan or while execution of the first query plan was interrupted. The external updates are transactionally validated in conjunction with executing the updated query plan.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein can implement database operations, including index build operations, or other operations, that can be resumed after a system failure with minimal loss of work. Some embodiments can be paused and resumed manually by users. Additionally or alternatively, embodiments can eliminate a need for a single long running transaction that causes out-of-log issues (due to the small log size compared to data size) for both cloud based databases and on-premise databases.

Embodiments may be described in the context of SQL Server® or Azure SQL Server® available from Microsoft Corporation of Redmond, Wash. However, those of skill in the art will appreciate that the concepts may be applied to other database offerings, or indeed other data stores and/or data handling products in general.

Further, note that the examples illustrated below are drawn to an index build operation, but it should be appreciated that the principles can be applied to nearly any transactionally based data structure generation.

For example, some embodiments may include functionality which enables one or more of the following:
Pause/resume index build operations. This may be done for example, to allow for performing index build operations during maintenance windows.
Resume index build operations after failovers and system failures.
Build large indexes even when only a small log size is available.

The following syntax provides an example of how this could be exposed to users:

```
ALTER INDEX {index_name | ALL } ON {table_name} REBUILD
WITH (ONLINE = ON, RESUMABLE = { ON | OFF} )
    ON - Index operation will be paused on failure and must be manually resumed.
    OFF - Operation cannot be paused and resumed. This is also the default.
```

Note that the same options could be implemented to apply to the T-SQL CREATE INDEX statement in SQL Server® and similar statements in other database systems.

Once a resumable operation has started, the users can control it, in one example embodiment, using the following commands:

```
ALTER INDEX {index_name | ALL} ON {table_name} { RESUME | ABORT}
    PAUSE - Pause a running index operation.
    RESUME - Resume an ndex operation paused manually or due to a failure.
    ABORT - Abort an index operation. It affects a running or paused index build operation.
```

Figure 1:
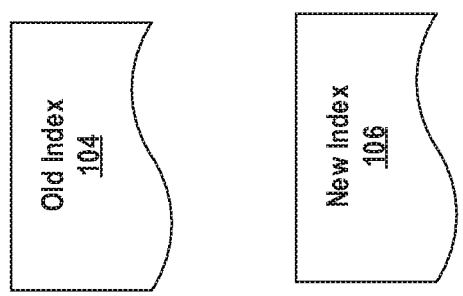
FIG. 1 illustrates a database and two different indexes indexing a table in the database.
Figure 1:
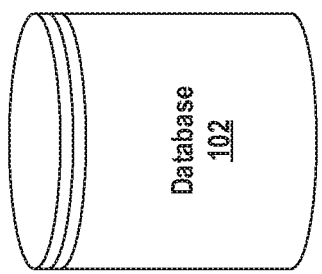

For example, reference is now made to FIG. 1. FIG. 1 illustrates a database 102. The database may have an index 104 associated with it. However, a user may wish to create a new index 106 of the data items in the database 102. Thus the user can initiate operations which cause the new index 106 to be created in a storage medium, such as hardware memory or on disk, of the data items in the database 102. Users may continue to use the old index 104 to find data items to access the database 102 while the new index 106 is being created. Alternatively or additionally, the old index 104 and new index 106 may be used in conjunction even when the new index is being created.

As can be appreciated, during the creation of the new index 106 there may be a desire to pause creation of the new index 106. For example, index creation operations often require large amounts of computing power. Thus, in some embodiments, index creation for the new index 106 can be paused when processing power is needed for other operations. For example, in some embodiments, the new index 106 may be created during time periods when the database 102 is experiencing low usage or is otherwise idle.

Alternatively or additionally, in some embodiments during the creation process of the new index 106, operations may fail. Embodiments illustrated herein are able to identify portions of the index creation process that were successful allowing index creation to be restarted without needing to perform some of the index creation operations that were successful.

Figure 2:
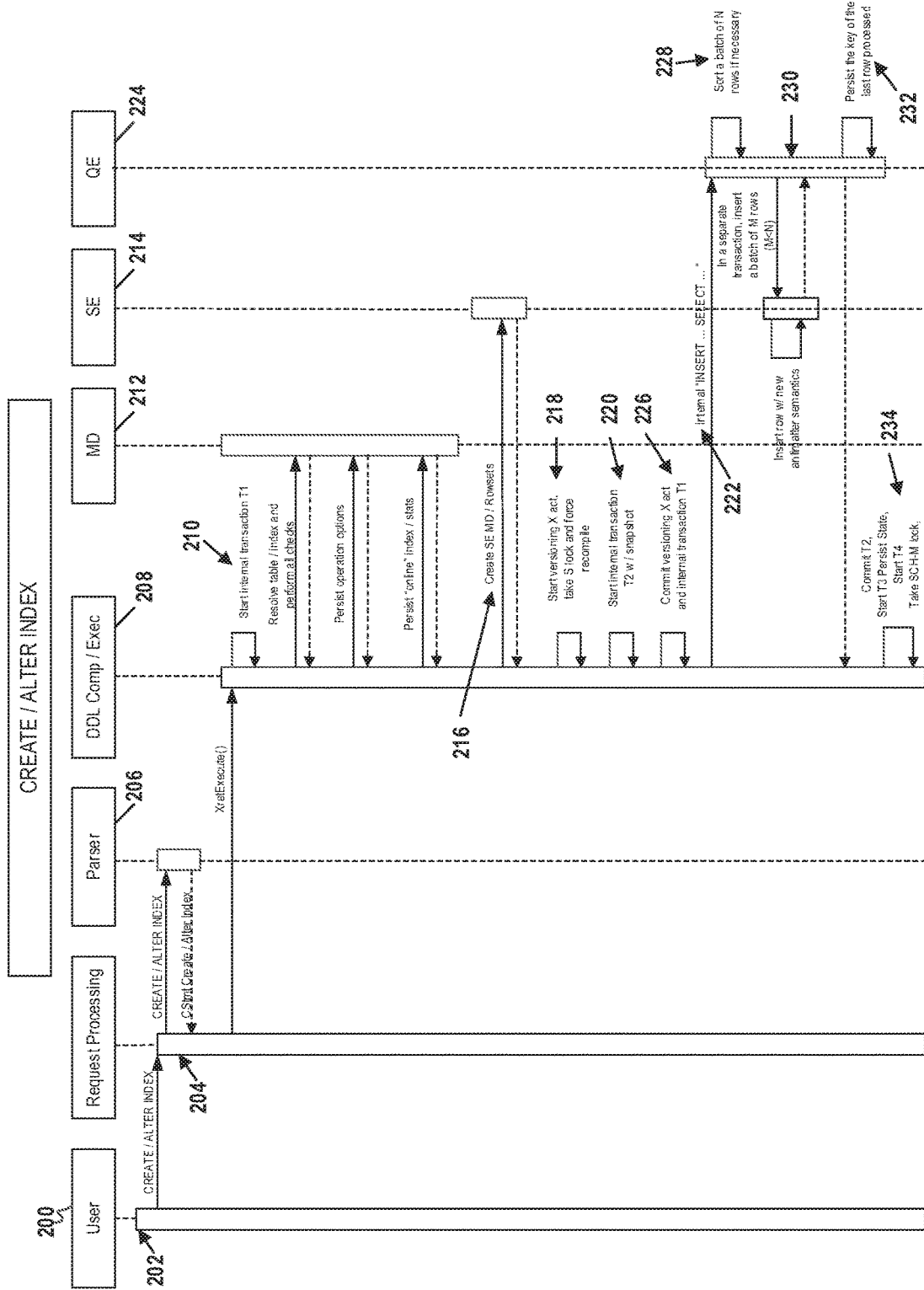
FIG. 2 illustrates a process flow and components for creating or altering a data structure.

FIG. 2 illustrates a workflow for performing an index build in a resumable fashion and the components involved.

As illustrated at 202, a user 200 initiates an operation indicating that an index is to be created and/or altered. As illustrated at 204, the operation will be parsed and compiled by a parser 206 and a execution engine 208 similar to a traditional nline index build, however the Data Definition Language (DDL) transaction will be changed to a read-only transaction. The parser 206 is query compiler component that examiners a string and converts it into an abstract syntax tree.

In execution, as illustrated at 210, the execution engine 208 and the metadata component 212 confirm that there is no user transaction started and embodiments start transaction T1 which is responsible for creating and persisting all the required metadata and initializing the index build operation. The metadata component stores information about the schema of all the objects in the database.

After performing all the required checks, the execution engine 208 creates the new index objects, and calls the Storage Engine (SE) 214 to create the required rowsets attaching them to the newly created indexes. In SQL Server®, available from Microsoft Corporation of Redmond, Wash., this is the component responsible for managing the physical storage of the data. After this is complete, embodiments persist the metadata for the new indexes to persistent storage and the options for the index build operation (e.g. partition to be built, etc.) so that embodiments can retrieve everything after a potential failure. At this point the operation becomes resumable.

As illustrated at 218, embodiments start the versioning transaction that will acquire the S lock on the table and establish versioning. As illustrated at 220, embodiments now start a read-only transaction T2 that will be responsible for the overall Online Index Build (OIB) operation. This transaction is responsible for a snapshot scan. To allow for log truncation during the overall operation, this transaction, in some embodiments, is read-only. Insert operations are performed in independent transactions that are frequently committed. Note: As described later, snapshot may not be required in some index build algorithms, but it still may be used for improved concurrency.

As illustrated at 222, the index build phase can now start and will be performed as a special INSERT . . . SELECT query. This Data Manipulation Language (DML) internally calls the index build Query Processor (QP) 224 iterators that will be extended to perform the operation incrementally and commit the progress so that embodiments can recover from any failures with minimum amount of work. At this point, as illustrated at 226, the versioning transaction and T1 are committed. Any failure before this point will result in the complete rollback of the operation.

In some embodiments, in contrast with current index build operations, if sorting is required, e.g. for new index creation, embodiments do not perform a full sort of the table, but instead gradually sort large batches of rows and insert them to the new index. This allows for performing the operation incrementally with acceptable performance. Without a full sort, however, embodiments cannot properly fill up the pages of the new index resulting in fragmentation. This is illustrated in more detail below.

Once a batch of rows has been sorted (if necessary), as illustrated at 228, embodiments can now start inserting rows into the target index, as illustrated at 230. The batches used for the insertion will be smaller to minimize blocking.

Once embodiments move to the next set of rows, embodiments update progress by persisting the key of the last row processed in persistent storage, as illustrated at 232, such as on disk or in non-volatile memory. If the rows were sorted, embodiments update progress processing moves to a new batch of rows to be sorted and not during the individual batches that are inserted. This means that a specific row can get processed twice in case of failure. However, as noted below, this can be accounted for.

When the index build process is complete, embodiments create a short lived internal transaction T3, which will persist the state indicating that index population has completed, as illustrated at 234.

Once the index build process is complete, embodiments create the final internal transaction T4, which will take the final schema modification (SCH-M) lock and finalize all metadata and indexes and commit the overall operation, again as illustrated at 234.

Based on the architecture described above:
There is no outstanding transaction that prevents log truncation while the operation is running or can cause the whole operation to be rolled back in the event of a failure.
If the operation fails, all resources are freed up, allowing the operation to stay in a "paused" state for large amounts of time. The only caveats, as described in more detail in the following description, are that DMLs have to maintain the new index while the operation is paused and the table is in a special state that disallows any operations that can modify the schema of the table.

Figure 3:
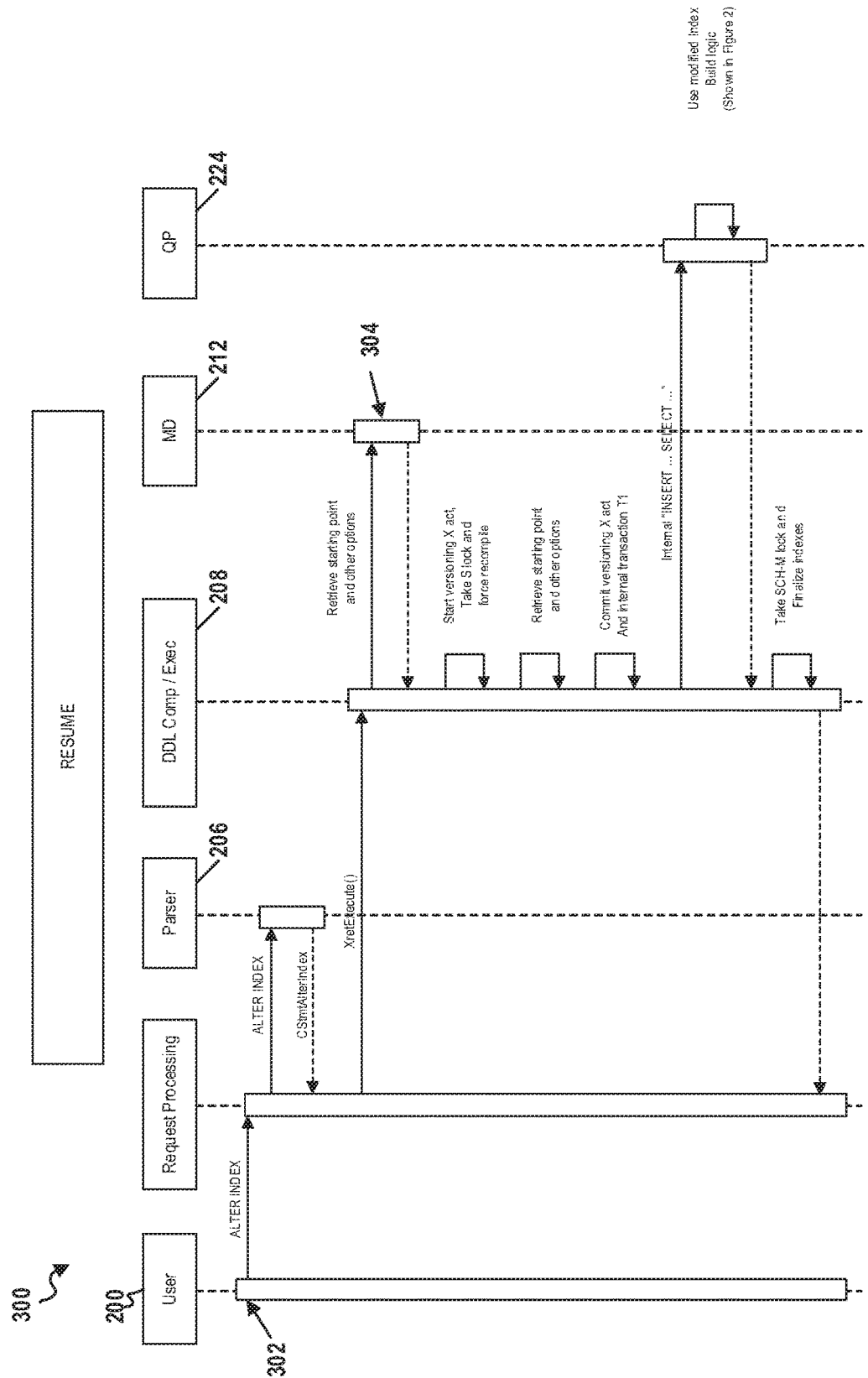
FIG. 3 illustrates a process flow for resuming creation or alteration of a data structure.

Referring now to FIG. 3, a workflow 300 for resuming a suspended index build operation is illustrated. Once a resumable index build operation has been suspended, either because the user manually paused it or because of some failure, the user can resume the operation at any point in time using a special command, as illustrated at 302.

FIG. 3 illustrates the workflow 300 for resuming a suspended index build operation. The RESUME operation is very similar to the original index build operation with the exception that instead of setting the index build operation up in the initial phase, it will simply retrieve the existing index options and metadata and the starting point where the operation stopped, as illustrated at 304.

Figure 4:
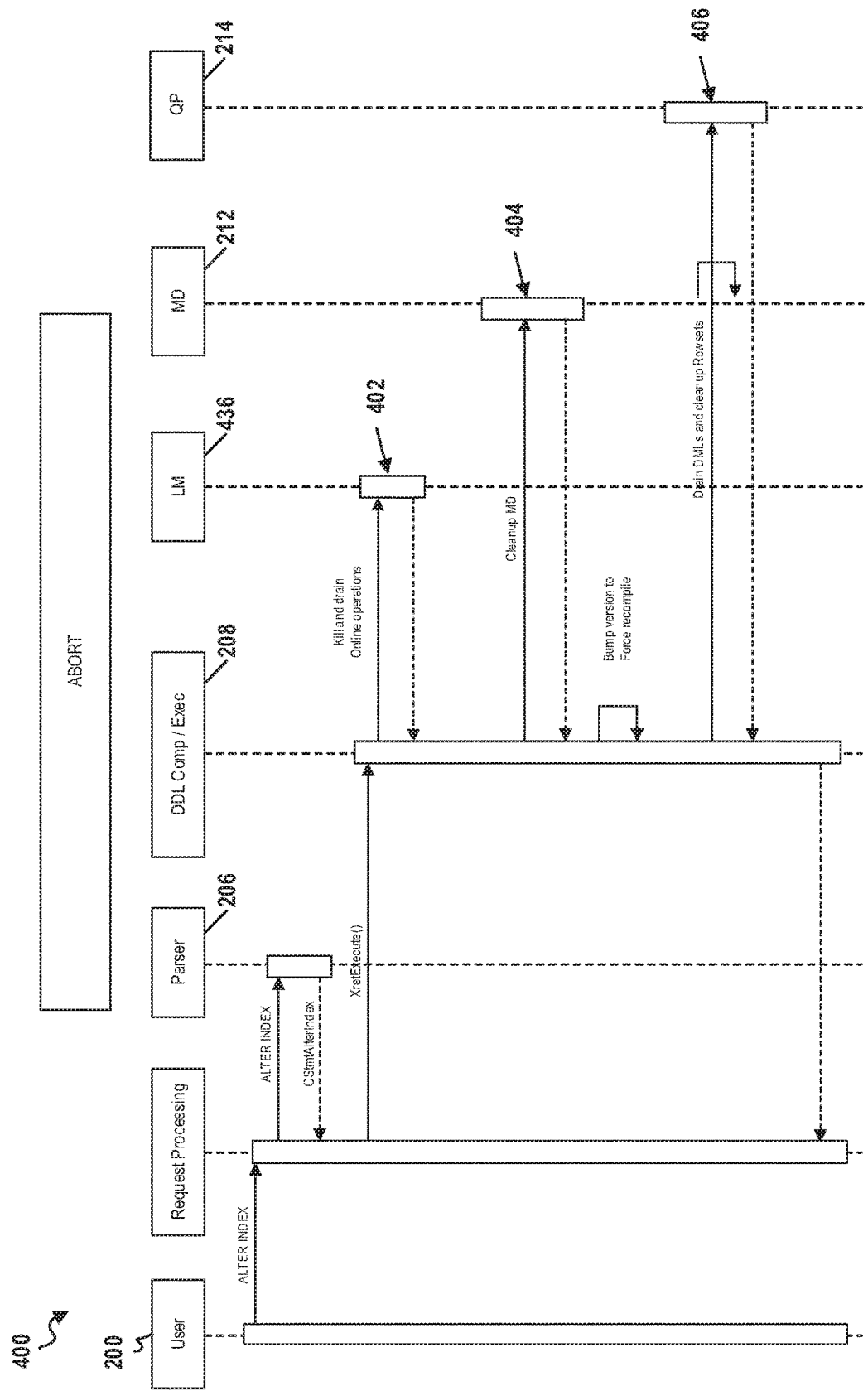
FIG. 4 illustrates aborting creation or alteration of a data structure.

FIG. 4 illustrates a workflow 400 for aborting a resumable index build operation. Given that the resumable index build illustrated herein is designed to withstand failures, simply cancelling the command, killing the session, etc. will not allow the user to completely abort such operations. Therefore, embodiments implement a special command for aborting outstanding index builds. FIG. 4 demonstrates the workflow for aborting a resumable index build operation. The operation is typically running on a separate dedicated thread.

The operation will first kill the ongoing OIB operation on this table and drain it, as illustrated at 402. This can be done by requesting the special OIB lock that currently exists. Then, as illustrated at 404, it will clean up the metadata for the new index and force a recompile so that any new DMLs stop using the new index. Finally, it will drain all DML on the table to clean up the rowsets, as illustrated at 406.

The following illustrates new DDL syntax that could be used in some embodiments. For backward compatibility, making an index build operation resumable could be implemented under a new option for the CREATE, ALTER and DROP index statements where the ONLINE option is applicable. For example, the syntax for ALTER INDEX could be the following:

```
ALTER INDEX { index_name | ALL } ON <object>
{
    REBUILD [ WITH ( <rebuild_index_option> [ , . . . n ] ) ]
    ...
}
rebuild_index_option > ::=
{
    ....
    | ONLINE = { ON | OFF }
    | RESUMABLE = { ON | OFF}
    ...
}
```

Where:
MANUAL—Index operation will be paused on failure or attention and must be manually resumed
OFF—default—operation cannot be paused and resumed
The syntax for CREATE and DROP INDEX, in some embodiments, is identical and therefore omitted here.

Additionally, some embodiments extend the ALTER INDEX DDL (or other appropriate data structure alter statements) statement to allow for two new actions that can RESUME or ABORT an outstanding resumable index operation. For example, consider the following:

```
ALTER INDEX { index_name | ALL } ON <object>
{
    REBUILD [ WITH ( <rebuild_index_option> [ , . . . n ] ) ]
    | DISABLE
    | REORGANIZE [ PARTITION = partition_number ] [ WITH ( <reorganize_option> ) ]
    | SET ( <set_index_option> [ , . . . n ] )
    | RESUME
    | ABORT
}
```

Where:
RESUME—Resumes an index operation paused manually or due to a failure
ABORT—Abort an index operation. It affects running or paused index build/rebuild
The ABORT command is used for resumable operations as an attention (cancel), killing the SPID or cutting the connection will only pause the operation and not completely roll it back. The explicit command is what users can use to completely abandon an outstanding resumable operation.

For an index build operation that is resumable, in some embodiments, the DDL will perform as follows:

- Embodiments fail the DDL if there is an explicit user transaction since embodiments want to handle the transactions internally and want to give clean transactional semantics.
- For resumable operations embodiments change the DDL transaction to a read only transaction, and perform all work that requires writes in subtransactions of the parent DDL transaction.
- Embodiments begin an internal transaction T1 that will handle creation of the online index, creating the necessary rowsets, and persisting all metadata to disk.
- After performing all the required checks, embodiments persist the metadata for the new indexes.
- Embodiments additionally store the options for the index build operation (e.g. partition to be built, etc.) so embodiments can retrieve everything after a potential failure. As it may be desirable to expose the DDL command in the new dynamic management view (DMV) (a system view that users can query to retrieve information about the system, which in the present example is about retrieving information about any resumable operations that are in progress) for resumable operations, embodiments also store the DDL statement itself in metadata. Embodiments can also leverage this to avoid extending metadata for every new index build option added in the future. Instead of storing all the options explicitly in metadata and retrieving them on RESUME, RESUME can simply parse and compile the stored DDL statement to retrieve all the options that were specified. For options that allow expressions, some embodiments still store the result value explicitly to guarantee that the value will not be computed differently on a RESUME.
- Embodiments mark the table as being "In resumable index build" so that embodiments can block other operations that are conflicting with OIB, such as DDLs, etc. Additionally, operations that are currently conflicting with OIB will check this flag before proceeding and fail if the flag is set.
- Embodiments call SE 214 to create the required rowsets and start the versioning transaction that will acquire the S lock on the table and establish versioning.
- At this point, embodiments bump the metadata version of the table to recompile all new queries so that they can start maintaining both indexes. To facilitate this recompile being persistent and not needing to have a recompile on roll back, the special "online" metadata version is no longer needed, but the traditional metadata version can be used instead.
- Embodiments now start an internal transaction T2 that will be responsible for the overall OIB operation. This transaction is responsible for the snapshot scan. To allow for log truncation during the overall operation, this transaction should be read-only. All INSERT and other side-effecting operations (statistics updates, etc.) operations will be performed in independent transactions that are frequently committed. Note: As described later, snapshot may not be required for the new index build process, but it can still be used for improved concurrency.
- The index build phase can now start and will be performed as a special INSERT . . . SELECT query. This DML internally calls the index build Query Processor (QP) iterators that will be extended to perform the operation incrementally and commit the progress so that embodiments can recover from any failures with minimum amount of work. At this point the versioning transaction and T1 are committed. Any failure before this point will result in the complete rollback of the operation.
- The algorithms that are used for sorting (if necessary) and main index maintenance logic are described in detail below.
- Once embodiments move to the next set of rows, embodiments are updating progress by persisting the key of the last row processed. If the rows were sorted, embodiments can update progress as embodiments move to a new batch of rows to be sorted and not during the individual batches that embodiments insert. This means that a specific row can get processed twice in case of failure. However, this can be handled as described below.
- Once the index build process is complete, embodiments start internal transaction T3 to persist the state of the index as having finished index build.
- Finally embodiments start internal transaction T4, take the SCH-M lock, finalize all metadata and indexes, and commit the overall operation.
- As embodiments move through the various phases of the index build process, embodiments track the phase that embodiments are currently at to be able to resume from there. For example, embodiments may track whether embodiments are in the 1st phase of OIB (Clustered index build), the 2nd (Non-clustered (NC) index build), or etc.

Embodiments may be implemented where the operation does not have any Virtual Log Records (VLRs) (these are not real log records, i.e. they don't get written to the transaction log on disk, but they have logic that is executed in memory when the transaction rolls back) that will rollback the overall operation.

In some embodiments, an ALTER INDEX statement includes an action to allow resuming any paused index build operation.

A RESUME operation, implemented in some embodiments, is very similar to the core part of the main DDL operation (described above) with the difference that instead of initializing the metadata and starting the index build from scratch, it will load the persisted metadata with the new indexes and options and start the index build process from where it left off.

To achieve this, an INSERT . . . SELECT query will load the key of the row where it needs to start from and initiate the scan from there.

For the cases where the scan is based on an index, a regular predicate will be used to initiate the scan from the row that embodiments processed last.

If the scan is using a heap, embodiments can still start a scan from where embodiments left off. Since embodiments are blocking operations that can rearrange pages on the heap, embodiments access the pages that existed for the index at the time the operation started. Even if embodiments miss rows that got inserted after the index build operation started, this is not an issue based on the algorithm described below, as long as embodiments visit all rows that existed when the operation started.

An ALTER INDEX statement implemented in some embodiments includes an action to allow aborting any paused or currently running index build operation. This mimics current OIB cleanup logic with the exception that it is running on a separate thread than OIB. The operation will first kill the ongoing OIB operation on this table and drain it. This can be done by requesting the special OIB lock with a KILL mode. Then it will clean up the metadata for the new index and force a recompile by bumping the metadata version of the table so that any new DMLs stop using the new index. Finally, similar to the OIB cleanup task, it will drain all DML on the table to clean up the rowsets.

As described above, there is new metadata that is persisted to allow the index build operation to be resumed.

In previous systems, the metadata for any indexes that are in the "online" state, i.e. indexes that are being currently built by an OIB operation, is only kept in-memory. To make the operation resumable, the metadata for these indexes is persisted. For example, in SQL Server®, one suitable table for storing this metadata is the sys.sysidxstats system table that is generally used to store index metadata. However, for REBUILD, the online indexes would conflict with existing indexes for the same table, since they would have the same id and name for the rebuild case. To address this issue, some embodiments reserve a new range of index IDs for the online indexes after the reserved range for temp indexes. The online index can be mapped to the existing index by using the following formula: new_index_id=current_index_id+ (x_metadataIndexStatsId_MinResumable).

Additionally, in some embodiments, the name of the index is set to the name of an index appended with a randomly generated guid so that it does not conflict with the existing index and since the existing index already has the name, embodiments can retrieve it from there.

For a CREATE case, the index can have its real name and ID with the exception that it is marked with some special "online" state.

Regarding the in memory representation, the online indexes are loaded from disk and attached to the existing index as its online version.

For persisting the DDL statement (to make it visible to the new DMV) and any other options of the index operations, embodiments implemented using SQL Servers® may use the sys.sysobjvalues system table, but introduce a new class. Embodiments use different valnum values to store all options under a single new class.

For persisting the index build phase, such embodiments may still use the new class in sys.sysobjvalues whereas for persisting the key of the last row that has been processed embodiments can use sys.sysseobjvalues which is more SE oriented. For that, embodiments can use the object_id as the main id, the index id as the subid and the key column id as the valnum, which will allow for storing the values for all the required columns and data types.

In previous systems OIB would holding an Intent Shared (IS) lock on the table and the special index build lock to prevent other activities from entering while OIB is running. Embodiments illustrated herein prevent these operations from running while the index build operation is in paused state as well, but some embodiments do not depend on locks for this purpose.

To achieve that, embodiments illustrated herein set a state on the table and, potentially, rowset metadata to block such operations.

The following illustrates a list of some of the operations that are blocked:
  Any schema change, including other online operations.
  Anything that would conflict with IS lock on the table.
  DBCC shrink, defrag, etc. which are already blocked for OIB and could also rearrange the pages of a heap causing the resumable scan to miss data.
On restart or any time the index cache is emptied when rehydrating the cache embodiments load resumable indexes at the same time as the index being rebuilt. Embodiments re-initialize the resumable index to be in the online build state, and gather all necessary fields to re-initiate the index build from that point. For any index undergoing resumable index rebuild embodiments do not lazily load, as relevant metadata needs to be present for the resumable index when calling resume.

The following describes an algorithm used to create a new index (that can have the same or different key columns and ordering than the source index) without requiring a consistent snapshot of the source index for the duration of the operation.

Not having a persistent snapshot is currently required in some embodiments because SQL Server® does not currently have a mechanism for supporting persistent snapshots, but it also allows for supporting pausing the index operation for a large amount of time without requiring maintenance of the older versions of all the records that get updated during this time.

The concept of so-called 'antimatter' is illustrated and used to track the state of each row in the target index. The antimatter, as illustrated herein, includes functionality to handle the fact that embodiments no longer have a consistent snapshot of the index and the index builder will see updates from concurrent DMLs after a failure occurs.

Concurrent DMLs maintain the new indexes and any mapping index in a similar way as they do in the current OIB algorithm. However, any row insertion generates an antimatter in the target index and any deletion generates a delete antimatter, regardless of whether the row was already found in the target index or not. This guarantees that embodiments have a persistent state for the every row.

Assume that the index builder is running on a single thread. The same algorithm can easily be extended for multi-threaded index builds by dividing the source index into disjoint ranges that are covered by individual threads.

Also assume that embodiments still use snapshot isolation for building part the index between two failures. Using snapshot isolation improves the concurrency of the algorithm, since no locks are held on the source index.

Each row has a unique identifier that is present in all indexes. For heaps, this is the Row Identifier (RID). In particular, for heaps, where there is no key on the index (indeed there is no index), each row is identified by the RID which is the tuple (page_id, slot_id_within_the_page). For clustered indexes, this is the clustered index key and the uniquefier, for non-unique indexes. For Non-Clustered indexes, this is the full payload of the index row (index_key, bookmark) where essentially the bookmark (key of the base index) is the unique identifier since the index_key can be duplicated.

Given that each row has a unique identifier, for each row in the source index, embodiments can identify the corresponding row in the target index. For clustered index creation, the mapping index maintains the mapping between the old and the new unique identifier. For all other cases, the unique identifier of the row remains the same.

Embodiments can use antimatter and delete antimatter to track the state of the row in the target index (whether it has been inserted or deleted). Any insertion (DML or index builder) marks the inserted row as antimatter and any deletion (regardless of whether the row is already present in the target index or not) inserts a delete antimatter. This allows for storing the state of each row in a persistent manner that does not depend on whether the row is visible to the index builder or not and therefore is not affected by restarts.

Since all DMLs are updating both the source and target index, any rows that can be found in the target index are guaranteed to be up to date.

As the index builder is copying rows from the source to the target index, it can use the antimatter state (regular or delete) to track whether the row has been inserted or deleted. If the row has been deleted, index builder will find a delete antimatter and the row can be deleted. Removing the delete antimatter is optional, since there is no way to guarantee that embodiments not have any antimatter rows at the end of the operation without a consistent snapshot. If the row has already been inserted by a concurrent DML, the index builder will find the antimatter row and can safely ignore this row since the version that has been inserted by the DML is guaranteed to be the newest version of the row.

Figure 5:
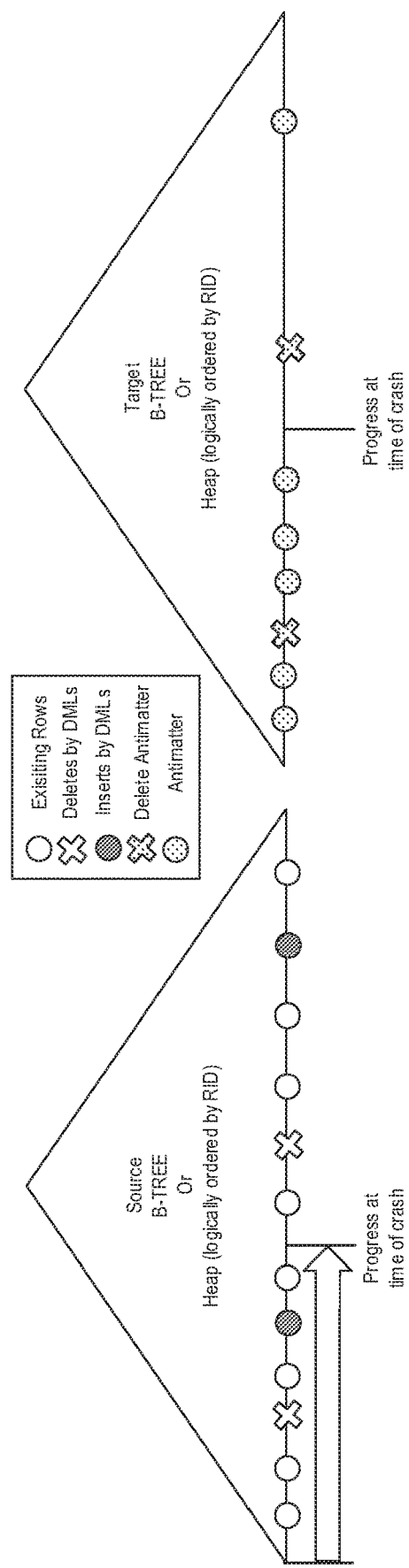
FIG. 5 illustrates state for source and target data structures while creation operations are running when a failure occurs.

FIG. 5 shows the state of the source and target indexes (or heap) while the index build operation is running and a failure occurs at time $t_f$ when the index builder has processed up to the Nth row of the source index.

For simplicity, the scenario where the target index has the same order as the source (same key columns and ordering) is shown, but the same algorithm is applicable for the scenario where the target index has different ordering.

The process works as follows:

The index build process starts at time $t_0$, takes a snapshot of the index and starts copying rows to the new index.

Concurrent DMLs are maintaining both the source and target indexes for any rows inserted or deleted (updates can be considered as a delete followed by an insert for the purposes of this algorithm).

This means that DMLs will insert/delete rows from the source index and insert regular or delete antimatters in the target index. As described above and can also be seen in the diagram of FIG. 5, all rows are marked as antimatter and delete antimatter regardless whether they were found in the target index or not.

As the index builder is copying rows to the target index, it will skip rows that are marked as regular or delete antimatter and marks any rows that get inserted as antimatter. Removing the delete antimatter for visited rows is possible since these rows will not be revisited and can help release some space, but it is optional since there is no way to guarantee that embodiments not have any antimatter rows at the end of the operation without a consistent snapshot.

The index builder copies rows to the target index in batches and commits the internal transactions, therefore all progress is preserved. Additionally, as part of each batch embodiments persist some metadata regarding the key (or RID) of the last row embodiments copied so that embodiments can resume from there after a failure. The metadata update is performed in the same transaction as the one used for the batch to guarantee that these two states are consistent.

When a failure occurs for the index builder at time $t_{f1}$, any inflight batch transactions are rolled back and the index is left in a consistent state. Since all metadata, rowsets, etc. have already been committed in earlier transactions, as described previously, the failure does not trigger the rollback of the whole operation and the index build should be able to resume from there.

Any concurrent DML operations that occur after the failure will still maintain both indexes as usual. This guarantees that inserts/deletes are also occurring on the new index, therefore guaranteeing that the new index is consistent as far as new operations are concerned.

After an arbitrary amount of time, the index builder can resume, by establishing a new snapshot and starting the scan from the Nth row where the previous run left off.

At this state, embodiments have the following categories of rows:

Rows deleted or inserted from/to the source index from the range of rows that the index builder has already processed. These have inserted delete or regular antimatters to the target index, but should have already been processed by the index builder and therefore cannot affect the process after the failure since they will not be revisited. Regular antimatters can be ignored (become regular rows) at the end of the operation, whereas delete antimatters are cleaned up/deleted (if not already removed, which is optional).

Rows deleted from the source index from the range of rows that the index builder has not processed yet. These have also inserted delete antimatters to the target index. Since the index build established a new snapshot after the resume, these deleted rows are no longer visible in the source index and therefore will not pose any issues. Their delete antimatters needs to be cleaned up/deleted at the end of the operation.

Rows inserted to the source index in the range of rows that the index builder has already processed. These rows have also been inserted to the target index with an antimatter state. These rows will be visible in the new snapshot but have already been inserted to the new index by the DMLs that inserted them. This means that the index builder will attempt to reinsert a duplicate row in the new index. To avoid this, the index builder will catch the duplicate key insertion and use the unique identifier of the row to check whether an identical row already exists in the target index. If the same row exists, it can be safely skipped since DML are guaranteed to insert the latest version of the row to the new index.

This operation continues until all rows in the source index have been processed. The same algorithm is applied if embodiments have multiple failures.

As described previously, some embodiments cannot guarantee that all antimatter state will be cleaned up at the end of the operation. After failures occur, rows might remain in delete or regular antimatter state at the end of the operation and are cleaned up.

For regular antimatter, embodiments can simply ignore the antimatter column of the row, but for delete antimatter, embodiments delete the rows either synchronously at the end of the operation, before switching the rowsets, or lazily if future scans are modified to ignore them. Also, this cleanup process is done efficiently to avoid a full table scan. To do this, embodiments may implement a collection mechanism similar to ghost page cleanup available in SQL Server®.

To avoid this complexity, embodiments can use the existing ghost state for each record to track the delete antimatter state. To do this safely, embodiments guarantee that embodiments do not have any existing ghost records that could be confused for delete antimatter. Since this is a new index and will start allocating fresh pages, embodiments are guaranteed not to have any ghost records at the beginning of the operation. Since the delete antimatter rows exist for the duration of the operation, embodiments ensure that ghost cleanup cannot clean up the rows/pages of this index. To achieve that embodiments can block ghost cleanup for the in-row data allocation unit of this index. This will guarantee that embodiments clean up ghosted records for all other indexes and the Small Large Objects/Large Objects (SLOB/LOB) allocation units, but will not clean up the ghost records that represent delete antimatters. This can be easily done, since ghost cleanup retrieves the AU id for each page it is processing and therefore can easily bypass rows for a specific allocation unit.

This logic prevents cleaning up ghost records from the target index's allocation unit, therefore, increases the space required for the index build operation to (2*size_of_index +insertions) since no deleted rows can get cleaned up while the operation is running.

Additionally, since embodiments do not clean up ghost records, there is no point to "annihilating" delete antimatters when the index builder visits a ghosted record, therefore simplifying the state machine, even further.

Figure 6:
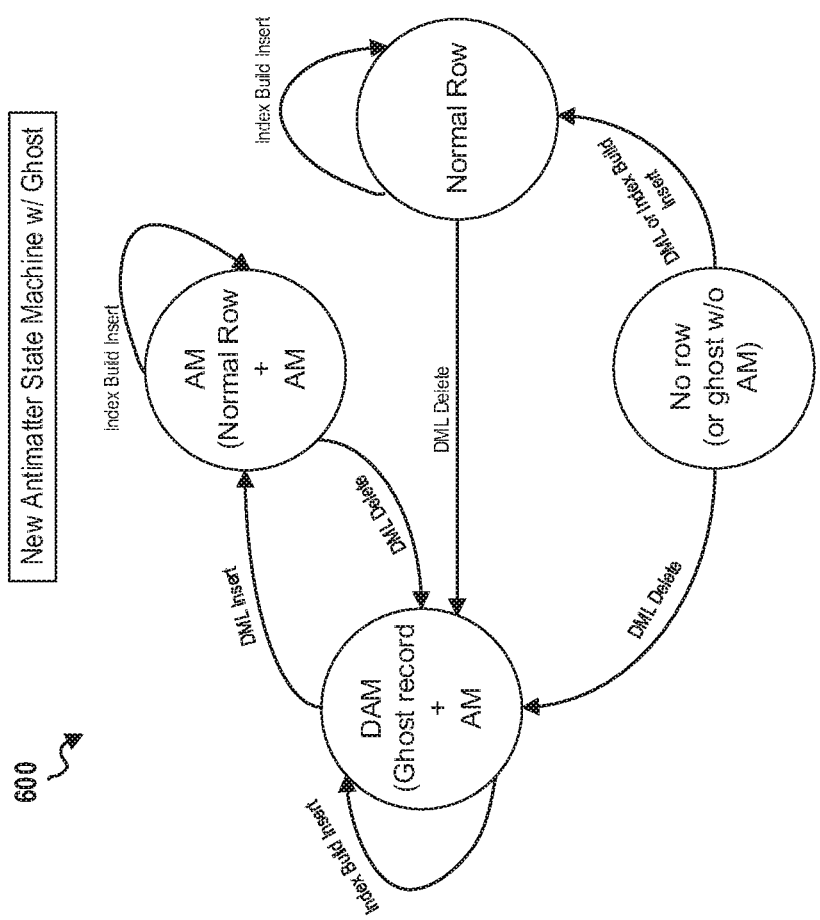
FIG. 6 illustrates an antimatter state machine for resumable data structure creation.

FIG. 6 illustrates the antimatter state machine 600 for resumable index build.

Resumable index build uses a single antimatter state, since, as described in the algorithm above, some embodiments do not differentiate between newly inserted rows and antimatter rows. The index builder treats those in the same way by skipping the row it is currently processing.

The antimatter state is used to distinguish rows that were deleted by concurrent DMLs from other ghost records that might have been introduced when an insert operation rolls back.

When a row gets deleted it is first marked as "antimatter" and then gets ghosted, as described previously, to get lazily cleaned up after the operation completes. When a row is inserted on top of an antimatter-ghost record, embodiments make sure that, if the insert transaction rolls back, the row returns back to the antimatter ghost state. To achieve that, some embodiments have two options:

(1) Reserve a bit on the record header to mark the record as antimatter and extend the insert undo log record to handle rolling back to the antimatter ghost state.

(2) Use the existing antimatter column that exists for all index builds to track the antimatter state and introduce a special state transition when a row gets inserted on top of an antimatter ghost to also mark the new row as antimatter. Because of that, rollback of that insert will automatically bring this row back to the antimatter ghost state by deleting it without requiring any special handling.

Consider the following problem. The index key columns of unique NC indexes only contain the unique index columns and therefore cannot allow representing two rows with different unique identifiers that have the same values for the unique key columns of the new index. Here is an example of such a problematic case:

The source index contains row with c1=1 and c2=1
Index creation starts for unique NC index on c1
A DML inserts a row with c1=1 and c2=2
Index build crashes and establishes a new snapshot where both rows on the source index are visible
A delete comes and deletes both rows. The unique index does not have enough state to keep both "antimatters".
The index builder now processes the rows, but cannot find 2 antimatters and therefore inserts at least one row to the new index, corrupting it.

However, this is not a problem for rebuild (Clustered on NC) or unique clustered index creation. If the unique index already exists (with the same key columns) the index is guaranteed to have at most one row for each combination of keys and therefore this combination can be considered the identity of the row and is enough to represent its state in the target index. Based on that, there is no case where embodiments represent the state for more than one rows like in the example above. Clustered index creation uses the mapping index to store the antimatter state of each row. The key of the mapping index includes the unique key columns, but also the bookmark of the row which can be used as the unique identifier to track the state of every row.

A solution to this problem is to use a mapping index to track the state of the rows even for unique NC index creation. The mapping index will include the bookmark of each row, allowing for storage of the state of multiple rows with the same value for the unique index key columns. At the same time the new index will be verifying the uniqueness of its key, similar to unique clustered index creation.

Embodiments may use wide plans for DMLs that are executed while this operation is in progress (or paused) resulting in some performance impact. Another approach would be to introduce the mapping index in SE.

Consider the index build operation in the absence of concurrent DMLs.

Assume that the index builder is seeing a consistent version of the row that is currently processing and therefore the content of the row is intact. This can be achieved by either holding a S lock on the row until it gets successfully migrated to the target index or by using snapshot isolation.

The index builder is processing all rows of the source index $I_{source}$ and copies them to $I_{target}$. Since it is using a table scan, it is guaranteed to visit every row but also not process any row twice, therefore maintaining all invariants described above. Even in the event of a failure, since the operation is transactional, the consistency of the index is guaranteed. The scan will proceed from the next row where it stopped, since embodiments remember the key of the last row embodiments processed, so all invariants are still maintained.

As far as unique key constraints are concerned, the index itself enforces the uniqueness for its key and the operation will fail if the constraint is violated.

Now consider how concurrent DMLs can affect this operation:

For row $R_{source, current}$ where (current<current_OIB):
Since these DMLs are modifying rows in the portion of $I_{source}$ that has already been processed by the index builder, any modifications here are not visible to the index builder and therefore the index build operation is not affected by them. All rows in this portion of the index are guaranteed to exist in $I_{target}$ because the index builder has already copied them from $I_{source}$ or because they were inserted by concurrent DMLs. $I_{target}$ a can additionally contains some delete antimatter rows, but these can be considered equivalent to deleted rows (based on the state machine illustrated in FIG. 5) and will simply get converted into regular antimatter if a DML inserts a row with the same identifier. DMLs maintain both indexes and therefore embodiments are guaranteed that the exact same operation will occur on both indexes and therefore all invariants described above will be maintained.

As far as unique key constraints are concerned, the index itself enforces the uniqueness for its key and since the algorithm is not affecting the key of each row whatsoever, embodiments are guaranteed that any unique violation will be detected and the DML operation will fail.

For row $R_{source, current}$ where (current≥current_OIB):
For inserts, the row will be inserted in both indexes, but will then be visible to the index builder since current>current_OIB. However, when processing this row, the index builder will be able to remap $K_{source,i}$ to $K_{target,i}$ for this row and identify whether the row already exists in the target index. If it does, it can just ignore the row, since the row has already been copied there by a DML operation and DML update the row to the newest version. If the row was deleted in the meantime by another DML operation, based on the state machine illustrated in FIG. 5, a delete antimatter will be inserted so the index builder is aware of the state of this row and can ignore it. Therefore, because there is a way of uniquely identifying a row in the new index, embodiments are guaranteed not to insert the row twice. Additionally, since concurrent DML are maintaining both indexes, all inserted rows are guaranteed to have the most updated row content. As far as unique key constraints are concerned, the index itself enforces the uniqueness for its key and since the algorithm is not affecting the key of each row whatsoever, embodiments are guaranteed that any unique violation will be detected and the DML operation will fail.

For deletes, the row is deleted from $I_{source}$ and a delete antimatter is inserted to $I_{target}$ both when the row being processed has not yet been copied to $I_{target}$, but also when it was inserted by an earlier DML and therefore already exists in $I_{target}$.

For current>current_OIB, the row is invisible for the index builder and there is no way it can get incorrectly inserted to the target index.

For current=current_OIB, where the index builder has already seen this row, but not yet inserted it to $I_{target}$, the delete inserts the delete antimatter, so when the index builder will try to insert the row, it will detect the delete antimatter and skip this row.

Any Delete Antimatter (DAM) on the target index might still stay there until the end of the operation, but is not affecting the operation otherwise and can be cleaned up eventually.

Because these two are individual indexes, embodiments could potentially encounter race conditions, where the state specified in the mapping index is not consistent with the state in the actual index. However, since both the index builder and all concurrent DMLs will update the mapping index first, attempting to set the state for the row, they will acquire an X lock on the row there and therefore synchronize with all other activity on the row.

Embodiments may additionally or alternatively implement a resumable sort.

New index creation uses a full table sort for at least two reasons: performance and fragmentation of the new index. With respect to performance, without sorting, the index build operation would be inserting rows at random pages of the new index causing a random IO for each row insertion. Sorting itself performs mostly sequential IO and once the data is sorted, the index builder is guaranteed to be filling up pages incrementally and avoid random IO. With respect to fragmentation of the new index, when data is sorted, the index builder can fill up each page completely before moving to the next page and (module concurrent DMLs) this can guarantee very low fragmentation, since pages are allocated sequentially, and perfect fill factor, since embodiments do not have page splits. Performing a full table sort requires a significant amount of resources and time for large tables.

One solution is to avoid doing a full table sort of the original index for Resumable Index builds, but instead just insert row-by-row or read relatively large chunks of rows (e.g. 10M rows) at a time, sort them and insert them to the new index. The problem with these approaches is that the insertions to the new index can happen at random places, therefore: requiring physical IO to load the pages of the new index in memory when the size of the buffer pool is not enough to fit the whole index and causing fragmentation to the new index, since embodiments have random insertions to pages that might have already be full and therefore causing page splits.

Even though reading large batches improves the locality of the inserts to some extent, it is still not significantly better when the size of the table is significantly larger than the size of the batch being sorted.

Embodiments may split the work based on the target key columns. Embodiments essentially split the work (for parallel this is assigned to each thread, for the case this would be the unit of resumability) based on the key columns of the new index, instead of the current index. For example, if embodiments are building an index on column C2, embodiments could split the work into chunks of 0<C2<10, 0<C2<20, etc. This allows for performing partial sorts that when "merged" together give a full sort and therefore achieve optimal quality (minimum fragmentation) of the new index.

Previously, parallel index build required each thread to perform a full table scan to retrieve the rows it needs to process. In this case, to avoid multiple full table scans that would impact the performance and resumability (resumability SLA would be bound by the time to perform a full table scan), systems could perform a single table scan and insert all data into an intermediate data structure (e.g., a heap) that is partitioned based on the ranges embodiments selected above.

Once the intermediate structure is built, some systems process each partition individually, sort it and insert it into the new index. This logic depends on the assumption that each partition can be small enough, since processing each partition is the unit of resumability.

This, however, may not be a safe assumption to make. Defining the partition boundaries requires creating a histogram for the target column and splitting the range accordingly. Histograms are currently only supported for a single column which means that the partition currently only depend on the leading key column. Systems could extend statistics logic to support multi-column stats. However, there may still be cases, where the index is created on a column with very few distinct values, making it hard to define small partitions.

One solution, as illustrated herein is to implement a merge sort that is resumable. Fundamentally, merge sort can resume since it is splitting the work into batches and processes (i.e., sorts) them independently, merging them at the end. To make the whole operation resumable, embodiments make each part of the process resumable.

Merge sort reads the input data, sorts it in memory and flushes the sorted data to disk when there is not enough memory to process more data, to free up the in-memory buffers. The chunks of sorted data that are persisted to disk are known as 'sort runs'. To make this process resumable, embodiments track where the current sort run begins when reading data from the source index and have an upper bound on the size of the input, so that large amounts of work are not lost even on systems with very high (e.g., TBs) available memory. Once the run is complete, embodiments move the cursor on the source index. Finally, embodiments can recover the content of the sort runs after a failure, which means logging and/or checkpointing the data that gets inserted in each run, but also tracking metadata about the runs embodiments have already created and where they are stored.

Once embodiments have generated a significant number of individual runs (currently SQL supports up to 128), merge sort will merge them into one new run. If this is the final set of runs, this will trigger the final merge which will output the data to the caller. To make this process resumable, embodiments would remember the next element that needs to be processed in each run (similar to the core rebuild algorithm) but also, if this is not the final merge, store the output run content and its metadata using a mechanism as described above to allow as to recover it after a failure.

For the overall operation to be resumable, embodiments store some metadata about the current state of the operation, the phase that embodiments stopped at (run generation or merging) and the already generated runs. With this information, the operation is resumed from where it stopped, losing only the last run that was generated or the last batch of rows that were merged.

This solution allows for making new index creation resumable with high performance for the scenarios being targeted and without compromising on the quality (e.g., fragmentation) of the new index.

The high level logic to support resumable merge sort was described above. Here, more details are provided regarding the implementation of this feature and how it can be embedded in the index build operation:

Embodiments start a resumable scan on the source index, tracking the progress made. This will feed the input to the sort, that will only advance the progress in the source index after a run has been generated and persisted to disk. Generating a run and updating tour progress can be done as a single transaction, since there are no locks held on shared resources (the run is local to the thread).

Once a sort run has been created, metadata regarding its existence (runId) and location (starting pageId) are persisted in metadata, for example using the sys.sysobjvalues system table in SQL Server®. This will be done in the same transaction that created the run.

If there is a failure, any sort runs that were in progress will be rolled back. On Resume, embodiments load all the metadata about the already generated runs and feed it to the index build query plan so the sort can rebuild its state and resume from where it stopped.

Embodiments allocate all the sort pages from an allocation unit that is persistent and log the content of the rows (minimal logging can be used for simple and bulk recovery mode). For this purpose, embodiments can still reuse the code for managing sort pages, since it allows for accessing the rows in the order they were inserted which is important for sorting. Embodiments log the content of these pages.

To avoid unnecessary logging, some embodiments only log the sort runs before the final merge. This means that if the final merge can support up to N-way merge (currently this is set to 128 for SQL), the unit of resumability will be 1/N of the table size. While this is an acceptable threshold even for large tables, embodiments can increase the number of runs that can be merged in one step to account for even large tables.

To achieve this, embodiments can divide the approximate number of rows for the table by N (allowing room for error) and then perform a regular sort for these rows, persisting the result as a merge run that will be fed into the final merge. This logic means that the run generated for the resumable sort might not be aligned to the runs generated based on the available memory, therefore causing embodiments to either: a) close the sort run early even though there is enough memory to process more rows, resulting in less efficient final merge or b) spill when sorting the data due to insufficient memory, but also "spill" to persist the final run.

Once all the runs have been generated, embodiments start the merge process. The phase of the operation is stored in metadata and will be updated accordingly. The merge process can be invoked as a completely separate internal query or as part of the same original query, only after all sort runs have been generated.

Performing the final merge for a large table can take significant amount of time, therefore harming the resumability of the algorithm. To make sort resumable, embodiments track the progress merge has made in each run. Insertions to the new index will be made in small transactions (batches of N rows) that will also advance the cursor in each sort run and deallocate any pages/extents that have been processed. Using this algorithm, embodiments can resume the merge operation after a failure has occurred with minimal loss of work.

As noted above, the final sort runs are persisted and recoverable to allow the operation to be resumable. This means that this data is stored and logged as part of the user database (and not in a temporary database). This has implications regarding the required disk space as well as the log generated by the operation.

The space requirements for this operation are similar to the index build without the SORT_IN_TEMPDB option. The final sort runs will be persisted in pages in the user database, requiring an extra (1*size_of_target_index) disk space. However, as these runs are being merged, the extents storing the sorted data can be deallocated and reused for the final index. Therefore, the overall space requirements in the user DB should be similar to the index build without the SORT_IN_TEMPDB option.

For simple and bulk recovery mode, all sort pages can be minimally logged and flushed to disk before committing the transaction that generated them, minimizing the amount of log required for this operation. However, with full recovery mode, the content of all pages are fully logged. This will generate an extra (1*size_of_target_index) log than what the operation usually generates today. For cases where logging is the main bottleneck of the operation, this could regress the performance of the operation to 2×.

Advantageously, since the sort runs will be generated in small incremental transactions, the log will be continuously truncated, creating efficient use of log space.

In existing systems, the sort is created based on the snapshot of the source index, therefore the result of the sort is guaranteed to be identical to this snapshot. This is no longer the case for Resumable index build since the sort runs can be generated across multiple restarts and do not depend on a snapshot scan. However, this is not a problem for the Resumable index build algorithm described above. Embodiments can perform the sort as a random delay between reading the row from the source index and inserting it into the target index. Since concurrent DMLs are maintaining both indexes during this time, this delay does not affect the algorithm and should not cause any issues.

Some embodiments can handle LOBs without performing deep copy. If the sort table only references LOBs by their pointer, there may be a challenge for embodiments to guarantee their consistency. Current systems handle this by either holding the locks for the duration of the sort or using versioning (the latter applies for OIB), but this does not apply for some resumable sort embodiments since typically embodiments cannot hold locks or maintain a consistent snapshot across restarts. One solution to this problem is as follows: restrictions may be defined where LOBs can not be index key columns and therefore accessing LOBs is not required for identifying the mapping between a row in the source index and a row in the target index. The consistency problem only exists when LOBs get updated, but, as described previously, DMLs are guaranteed to update/insert any rows in the target index when they update a row of the source index. This means that any LOBs that have been updated should also be updated in the target index. Based on that, the index builder typically does not access a LOB for a row where the LOB handle might be stale since if the row was updated, it should have already been moved to the new index by the DML that performed the update and the OIB logic would skip this row. Therefore, some embodiments could allow LOB handles to be stale in the sort runs as long as there is no attempt to access the underlying LOBs.

To support resumability, embodiments have constraints on a query plan for the index build process.

First, the plan should be "resumable", meaning that embodiments should be able to resume the work for all the operators with minimal loss of work. As parallelism and filtered indexes are introduced (as illustrated in more detail below) the index build plans can get more complicated and involve more operations. Query plans can define how the query plans can be resumed or lock down Query Optimizer (QO) rules to restrict the number of possible plans. Since many of the QO optimization are mostly applicable to small indexes, where resumability is not as important, the embodiments can restrict QO rules for resumable Index builds and allow more optimizations as necessary.

When some embodiments resume, these embodiments use the same query plan or a query plan that can be resumed based on the progress embodiments have tracked during the previous execution. For example, embodiments use the same source index, same seek ranges (for filtered indexes), etc. This can be achieved by using USEPLAN hints or actually enforcing the logic within QO/QP. Since USEPLAN is not forcing all query properties, such as DOP, etc.

Filtered indexes introduce some extra technical challenges because their filter expressions complicate the index build plan and can potentially generate more complex query plans that require some extra work to make resumable.

For example, if the filter predicate is on the key columns of the source index, the query plan can contain a range with seek predicates on the filter predicate. At the same time for resumability, embodiments force a different seek predicate to resume the operation from where it stopped. To handle this scenario properly, embodiments may include a mechanism of merging the two ranges. The "resume" range may be a subset of the filter range and therefore, embodiments should be able to merge the ranges without too much complexity.

Additionally, based on the selectivity of the filter predicate, QO can pick completely different query plans both in terms of the index selection as well as parallelism strategy. For example, for very low selectivity, it is possible that embodiments pick a plan that uses a Nested loop join (NLJ) between a NC index and the clustered index to fetch only the rows that qualify. Some embodiments that support such plans are able to resume them from the point they stopped.

Embodiments can be extended to support parallelism, but the variety of parallel plans that QO generates, especially in the presence of filtered indexes, may require that each plan shape be handled separately and address a different set of problems. The following illustrates parallel plans that may be selected by index builder.

One parallel plan is a partitioned scan. This seems to be the most common plan (and potentially the only one generated for rebuilds) and the logic is that embodiments split the range of values of the leading key column of the new index in N ranges and each thread performs an independent scan with a filter on its assigned range. For rebuilds, since the source index is also on the same column, this predicate is seekable. The same thread sorts and inserts the qualified rows to the new index.

Since each thread has its own independent scan, to make this plan resumable, embodiments persist the partition ranges and each thread will also persist its progress based on the source index key using the same system tables described in the metadata section. Since the number of key columns is very limited, embodiments can split the valnum (or equivalent) column in SQL Server® in two parts and have the most significant 2 bytes indicating the thread ID and the 2 least significant indicating the key column ID. With that embodiments can store the range for each thread and its current position.

On resume, embodiments reload the same partition ranges and force each thread to start from the point where it last stopped. Since the progress is tracked based on the source index key, this predicate will be seekable.

One interesting challenge is that the partition ranges are now persisted on disk and therefore apply even after a restore, changeSLO, etc. where the resources on the new machine, SLO, RG can be different than when the original operation started.

To address this, some embodiments split the table into more ranges than the current degree of parallelism so that embodiments can assign them evenly to more or less threads if the degree of parallelism changes in the future. Each available thread picks up the next range and persists the progress of this range. Once complete, it moves to the next range and so on. This allows for handling scenarios where the degree of parallelism is higher or lower when the operation is resumed since one thread can process more than one ranges. Especially in the case of index rebuild, since the ranges are based on the existing index, there is no overhead for each thread to process multiple ranges, since it can immediately position itself to the beginning of the range using the index and start from there.

Another parallel plan that QO can generate, mainly for scenarios where embodiments are creating a filtered index with some selectivity, is to have a shared parallel scan (or even a single threaded scan if the selectivity is low) that feeds a range exchange (partition or stop) that splits the scanned data into multiple ranges that are defined based on the leading key column of the target index, similar to the previous type of plan. After that, each thread sorts and inserts its data independently.

To make this plan resumable, embodiments may persist the ranges and have each thread tracking the last row it persisted to the new index. On resume, embodiments can reload the previous ranges and start the shared scan from the minimum of the progress of all threads. This will guarantee that embodiments do not miss any row, however, unless embodiments introduce additional filters for the individual threads, some threads may see duplicate rows that they have already inserted.

Partitioned indexes have a special index build plan where essentially each thread is responsible for building a specific partition. This is achieved by a ConstScan that is feeding the partition IDs and is pushed though an apply to the index build side. This plan can be made resumable by tracking the progress in each partition and resuming from there.

Unaligned partitioned index build plans are similar to "Parallel Scan" plans, with the exception that the exchange partition range is split based on the partition Id virtual column. If parallel plans are not included, then embodiments have to modify this plan to make it a "Partitioned scan" to support this scenario. In this way, all threads will scan all partitions and filter out rows that do not belong to the target partition they are building.

In parallel plans for new index creation, since the predicate for the partitioning ranges is not seekable (since it is on the leading key column of the new index), based on data distribution, there might be threads that will not get any data from SE for large amounts of time as no rows will qualify from the scan. In some embodiments, this means that these threads will update their progress and therefore will lose a lot of work in the event of a failure.

This should not be an issue for rebuilds, since the range predicate is seekable (and there is no filter predicate) and all threads will consistently find rows that qualify.

However, to resolve this problem, embodiments can periodically update the progress even if no rows qualify. Some embodiments may send some "fake" rows from the scan so that the index builder updates the progress for this thread even though no rows get actually inserted to the new index.

Another interesting challenge is that the way embodiments split the range is now persisted on disk and therefore applies even after a restore, changeSLO, etc. where the resources on the new machine, Service Level Object (SLO) (this is essentially the configuration the user has picked for their cloud database; how many cores, how much memory, etc.), Resource Governance (RG) (this is a feature in SQL Server® that allows the user to configure how much resources each query should use in terms of CPU, memory, etc.) can be different than when the original operation started.

To address this, embodiments reassign the ranges to different tasks. Moving to more threads should be possible, since embodiments track the progress for each range and embodiments can assign it to a different task to continue the work. However, reducing the number of threads introduces further complexity, since one thread needs to process different ranges that might have made completely different progress. For rebuild embodiments can seek to the individual ranges. For new index creation though, where the partitioning column is not the same as the leading key column of the source index, evaluating different ranges may require multiple scans.

Embodiments may start by either forcing the same Degree Of Parallelism (DOP) on resume, so that embodiments do not repartition the range, or fail the query if there are not enough resources to use the required DOP.

Whenever an index operation is resumed, embodiments are establishing a new snapshot which means that any rows that were deleted since the previous snapshot are no longer visible. Therefore, any antimatter rows (which based on the algorithm described above means ghosted rows for this case) have been inserted until then will not be visible in the source index and are essentially useless and can safely be cleaned up.

To allow deallocating space while the index operation is paused and minimize the work required for cleanup after its completion, embodiments only block ghost cleanup when an OIB operation is actively running and not when it is paused. This can be easily done by setting some in-memory state during the OIB operation. Embodiments still guarantee that ghost cleanup cannot clean up rows that were inserted by DML after the snapshot was established, since this could cause embodiments to miss rows that are now visible in the snapshot. This should be automatically achieved by the S lock that is required for establishing a new snapshot, since this will drain all DMLs and ghost cleanup will not get to process their deleted rows since it will have already been disabled. Unblocking ghost cleanup can be done in a more lazy fashion, since delaying the cleanup cannot cause any issues.

As part of the index build operation, embodiments rebuild full table statistics, since embodiments are already visiting every row of the table. Building statistics has traditionally not been a resumable operation, which means that the intermediate information about the histogram is lost every time a restart occurs. However, embodiments can remedy this in various ways.

For example, some embodiments, build sampled statistics for any resumable index build operations. Instead of building full statistics, embodiments just completely ignore all statistics during the index build process and only execute a separate sampled statistics creation query once the index build operation completes. This means that the time required for creating the statistics will be within the resumability service level agreement (SLA) and therefore the overall operation is resumable.

Alternatively or additionally, embodiments may implement a resumable statistics creation process. There is already code in QO for merging histograms coming from separate portions of the data that is currently used for parallel statistics building as well as incremental statistics in SQL Server®. Embodiments could reuse this logic and incrementally build statistics that are persisted on disk, so that they can survive from failures and eventually be merged together to form the final stats.

While online index builds have been illustrated, it should be appreciated that some embodiments may support resumability for the offline scenario. One of the main value propositions of resumable index build is that all queries are allowed and no resources are held while the index build operation is paused. To achieve this, embodiments use the online index build infrastructure for offline index build. The difference is that while the operation is in progress, embodiments be holding an exclusive (SCH-M) lock on the table, so that the operation is offline.

While the OIB operation is paused, embodiments could expose the new index as a filtered index with a predicate based on the point where the index operation was paused, so that concurrent DML operations do not maintain the index for the values that the index builder has not yet processed, resulting in improved performance for the cases where the index build was paused early.

Additionally, embodiments could even allow SELECT operations to use this filtered index to get improved plans.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
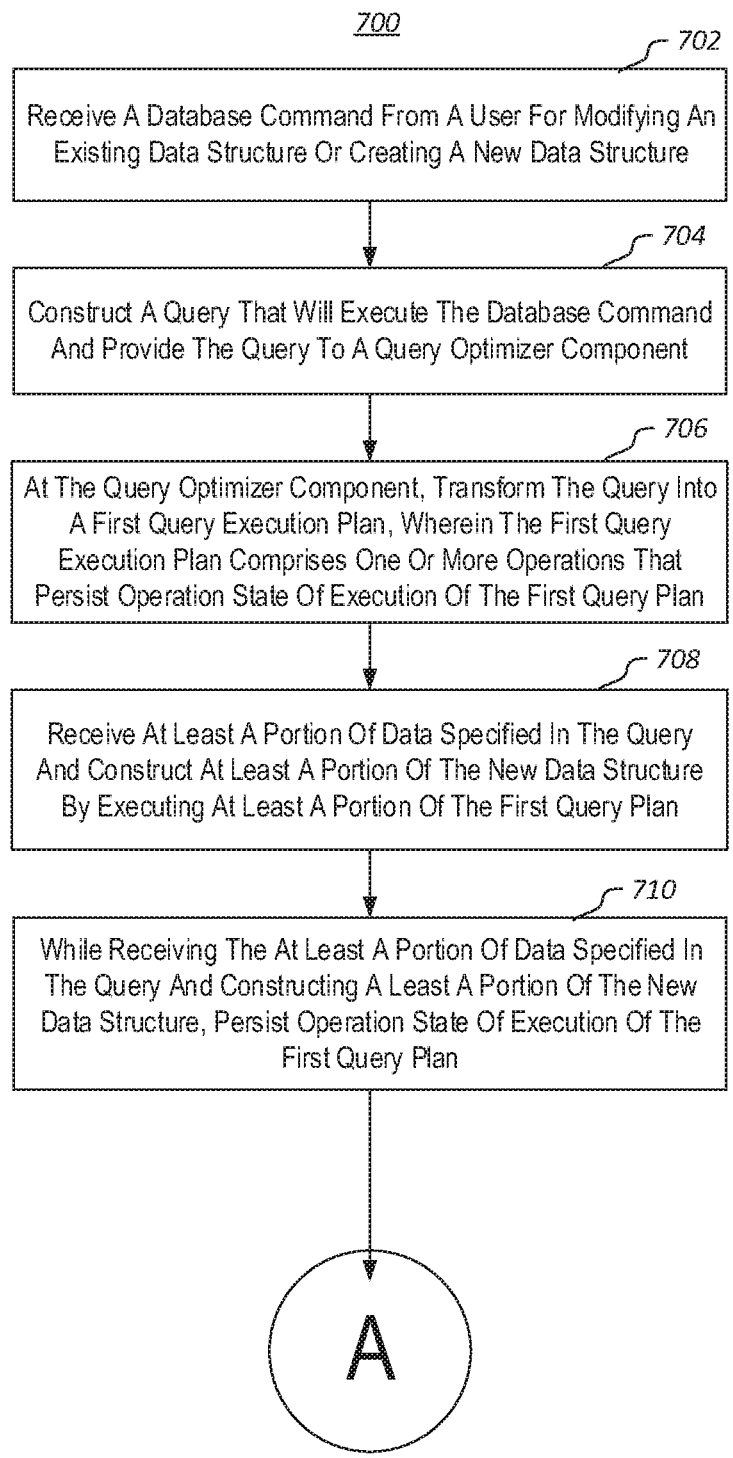
FIG. 7 illustrates a method of generating a new data structure.
Figure 7:
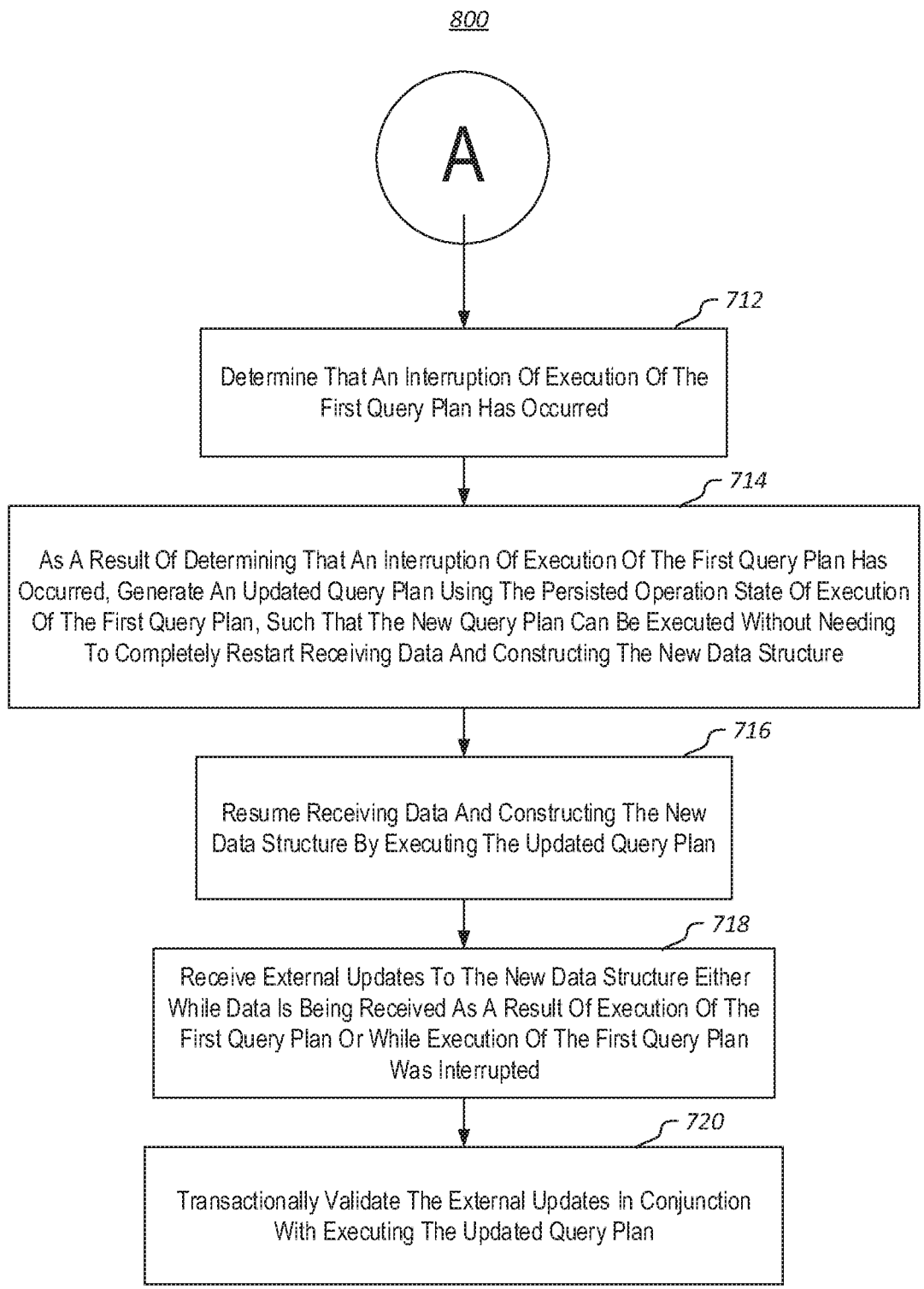

Referring now to FIG. 7, a method 700 is illustrated. The method 700 may be practiced in a database computing environment. The method includes acts for generating a new data structure.

The method 700 includes receiving a database command from a user for modifying an existing data structure or creating a new data structure (act 702). For example, a user may request that a new index be created for a database, such as the database 102 illustrated in FIG. 1. FIGS. 2-4 also illustrate a user 200 requesting various operations. The user may be a human user or a digital entity.

The method 700 further includes providing the query to a query optimizer component (act 704). For example, an example of a query optimizer component is illustrated by the QP 224 in FIGS. 2-4.

The method 700 further includes, at the query optimizer component, transforming the query into a first query execution plan, wherein the first query execution plan comprises one or more operations that persist operation state of execution of the first query plan (act 706). Thus, for example, the QP 224 may be configured to create a resumable query plan by persisting operation state of a query.

The method 700 further includes receiving at least a portion of data specified in the query and constructing at least a portion of the new data structure by executing at least a portion of the first query plan (act 708). Thus, for example, in FIG. 1, portions of the new index 106 may be created by using results from a queries executed on the database 102.

The method 700 further includes, while receiving the at least a portion of data specified in the query and constructing a least a portion of the new data structure, persisting operation state of execution of the first query plan (act 710). Thus, for example, as operations are performed to create and populate the new index 106, state may be saved indicating what portions of the query plan have been executed.

The method 700 further includes determining that an interruption of execution of the first query plan has occurred (act 712). Thus, for example, a user may need to interrupt the plan to use computing resources for some other purpose. Alternatively or additionally, execution of the first query plan may be interrupted due to some system failure, or for other reasons.

The method 700 further includes as a result of determining that an interruption of execution of the first query plan has occurred, generating an updated query plan using the persisted operation state of execution of the first query plan, such that the new query plan can be executed without needing to completely restart receiving data and constructing the new data structure (act 714). Thus, embodiments can create a new query plan using saved state allowing a new query plan to be constructed to leverages previously performed work in creating the new data structure, but which work was previously interrupted. Note that this can happen repeatedly. Thus, while first and new query plan have been used here, it should be appreciated that these terms refer generically to query plans and do not define particular occurrences. Thus, for example, execution of the first query plan as recited by the claims herein may refer to a query plan that is the result of one or several interruptions and resumptions processing using query plans created from saved state.

The method 700 further includes resuming receiving data and constructing the new data structure by executing the updated query plan (act 716). For example, as illustrated in FIG. 3 at 304, execution can resume where execution previously left off by using stored execution state.

The method 700 further includes receiving external updates to the new data structure either while data is being received as a result of execution of the first query plan or while execution of the first query plan was interrupted (act 718).

The method 700 further includes transactionally validating the external updates in conjunction with executing the updated query plan (act 720). Thus, updates may be made to the new data structure, for example, if a user adds or deletes data items to the data structure, even while creation of the data structure has been interrupted, and those updates can be preserved and validated, once creation of the data structure resumes as a result of executing the new query plan. Thus, transactional acts (e.g., data structure updates) can be validated, even when a transaction (e.g., execution of the first query execution plan) is interrupted and fails, when a new transaction (e.g., in this example, execution of the new query execution plan) that reuses state from the previous transaction is initiated and/or run.

The method 700 may further include preventing aborting and rolling back the at least a portion of actions taken to generate the new data structure, based an operation of adding or deleting a data item during interruption of execution of the first query plan.

The method 700 may further include preventing redundantly inserting a data item into the new data structure.

The method 700 may further include preventing redundantly deleting a data item in the new data structure.

The method 700 may further include cleaning up a marking indicating that a data item in the data structure was added or deleted during the interruption of execution of the first query plan.

The method 700 may further include as part of the execution of the first query plan: dividing a sort operation into a plurality of portions; performing a first portion of the sort operation; persisting intermediate results from the first portion of the sort operation; and persisting state of the sort operation identifying what portions of the sort operation have been performed.

The method 700 may be practiced where modifying an existing data structure or creating a new data structure comprises constructing a new index for a previously indexed data store.

The method 700 may be practiced where modifying an existing data structure or creating a new data structure comprises modifying a schema of a table. For example, this may include modifying the type of a column, or other such actions.

The method 700 may be practiced where the updated query plan comprises a different degree of parallelism than when the persisted state was created. For example, a single thread may have created persisted state, multi thread resumed query plan with persisted state).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to generate a new data structure, including instructions that are executable to configure the computer system to perform at least the following:
   receive a database command from a user for modifying an existing data structure or creating a new data structure;
   construct a query that will execute the database command and provide the query to a query optimizer component;
   at the query optimizer component, transform the query into a first query execution plan, wherein the first query execution plan comprises one or more operations that persist operation state of execution of the first query plan;
   receive at least a portion of data specified in the query and construct at least a portion of the new data structure by executing at least a portion of the first query plan;
   while receiving the at least a portion of data specified in the query and constructing a least a portion of the new data structure, persist operation state of execution of the first query plan;
   determine that an interruption of execution of the first query plan has occurred;
   as a result of determining that an interruption of execution of the first query plan has occurred, generate an updated query plan using the persisted operation state of execution of the first query plan determined at least in part based on stored metadata that includes information relating to a schema for objects related to the new data structure, such that the new query plan can be executed without completely restarting receiving data and constructing the new data structure;
   resume receiving data and constructing the new data structure by executing the updated query plan;
   receive external updates to the new data structure either while data is being received as a result of execution of the first query plan or while execution of the first query plan was interrupted; and
   transactionally validate the external updates in conjunction with executing the updated query plan.

2. The computer system of claim 1, wherein the one or more computer-readable media have stored thereon instructions that are executable by the one or more processors to configure the computer system to prevent aborting and rolling back the at least a portion of actions taken to generate the new data structure based on an operation of adding or deleting a data item during interruption of execution of the first query plan.

3. The computer system of claim 1, wherein the one or more computer-readable media have stored thereon instructions that are executable by the one or more processors to configure the computer system to prevent at least one of redundantly inserting a data item into the new data store or redundantly deleting a data item in the new data structure.

4. The computer system of claim 1, wherein a metadata component stores information relating to the schema for all the objects in a database related to the new data structure.

5. The computer system of claim 1, wherein the one or more computer-readable media have stored thereon instructions that are executable by the one or more processors to configure the computer system to clean up a marking indicating that a data item in the data structure was added or deleted during the interruption of execution of the first query plan.

6. The computer system of claim 1, wherein the one or more computer-readable media have stored thereon instructions that are executable by the one or more processors to configure the computer system to, as part of the execution of the first query plan:
divide a sort operation into a plurality of portions;
perform a first portion of the sort operation;
persist intermediate results from the first portion of the sort operation; and
persist state of the sort operation identifying what portions of the sort operation have been performed.

7. The computer system of claim 1, wherein modifying an existing data structure or creating a new data structure comprises constructing a new index for a previously indexed data store, including as a result of confirming that a user transaction has not started, create and persist the metadata, and initialize an index build operation, wherein the metadata is persisted for the new index to a persistent storage with options for the index build operation, wherein the index build operation tracks a state for each row of a database.

8. The computer system of claim 1, wherein modifying an existing data structure or creating a new data structure comprises modifying a schema of a table.

9. The computer system of claim 1, wherein the updated query plan comprises a different degree of parallelism than when the persisted state was created.

10. In a database computing environment, a method of generating a new data structure, the method comprising:
receiving a database command from a user for modifying an existing data structure or creating a new data structure;
constructing a query that will execute the database commend and providing the query to a query optimizer component;
at the query optimizer component, transforming the query into a first query execution plan, wherein the first query execution plan comprises one or more operations that persist operation state of execution of the first query plan;
receiving at least a portion of data specified in the query and constructing at least a portion of the new data structure by executing at least a portion of the first query plan;
while receiving the at least a portion of data specified in the query and constructing a least a portion of the new data structure, persisting operation state of execution of the first query plan;
determining that an interruption of execution of the first query plan has occurred;
as a result of determining that an interruption of execution of the first query plan has occurred, generating an updated query plan using the persisted operation state of execution of the first query plan determined at least in part based on stored metadata that includes information relating to a schema for objects related to the new data structure, such that the new query plan can be executed without completely restarting receiving data and constructing the new data structure;
resuming receiving data and constructing the new data structure by executing the updated query plan;
receiving external updates to the new data structure either while data is being received as a result of execution of the first query plan or while execution of the first query plan was interrupted; and
transactionally validating the external updates in conjunction with executing the updated query plan.

11. The method of claim 10, further comprising, preventing aborting and rolling back the at least a portion of actions taken to generate the new data structure based on an operation of adding or deleting a data item during interruption of execution of the first query plan.

12. The method of claim 10, further comprising, at least one of preventing redundantly inserting a data item into the new data structure or preventing redundantly deleting a data item in the new data structure.

13. The method of claim 10, wherein resuming receiving data comprises retrieving existing index options and the metadata, and a starting point wherein operation stopped as a result of the interruption.

14. The method of claim 10, further comprising cleaning up a marking indicating that a data item in the data structure was added or deleted during the interruption of execution of the first query plan.

15. The method of claim 10, further comprising as part of the execution of the first query plan:
dividing a sort operation into a plurality of portions;
performing a first portion of the sort operation;
persisting intermediate results from the first portion of the sort operation; and
persisting state of the sort operation identifying what portions of the sort operation have been performed.

16. The method of claim 10, wherein modifying an existing data structure or creating a new data structure comprises constructing a new index for a previously indexed data store.

17. The method of claim 10, wherein the updated query plan comprises a different degree of parallelism than when the persisted state was created.

18. A database computer system comprising:
an execution engine, wherein the execution engine is configured to perform at least the following:
receive a database command from a user for modifying an existing data structure or creating a new data structure;
construct a query that will execute the database command and transform the query into a first query execution plan, wherein the first query execution plan comprises one or more operations that persist operation state of execution of the first query plan;
provide the first execution plan to a query processor;
the query processor, wherein the query processor is configured to perform at least the following;

receive at least a portion of data specified in the query and constructing at least a portion of the new data structure by executing at least a portion of the first query plan;

while receiving the at least a portion of data specified in the query and constructing a least a portion of the new data structure, persist operation state of execution of the first query plan;

determine that an interruption of execution of the first query plan has occurred;

as a result of determining that an interruption of execution of the first query plan has occurred, generate an updated query plan using the persisted operation state of execution of the first query plan determined at least in part based on stored metadata that includes information relating to a schema for objects related to the new data structure, such that the new query plan can be executed without completely restarting receiving data and constructing the new data structure;

resume receiving data and constructing the new data structure by executing the updated query plan; and receive external updates to the new data structure either while data is being received as a result of execution of the first query plan or while execution of the first query plan was interrupted; and a storage engine, wherein the storage engine is configured to transactionally validate the external updates in conjunction with executing the updated query plan.

19. The database computer system of claim 18, wherein the database computer system is configured to:

divide a sort operation into a plurality of portions;

perform a first portion of the sort operation;

persist intermediate results from the first portion of the sort operation; and persist state of the sort operation identifying what portions of the sort operation have been performed.

20. The database computer system of claim 18, wherein modifying an existing data structure or creating a new data structure comprises constructing a new index for a previously indexed data store.

* * * * *